Feb. 6, 1934.
H. FRIEDRICH
1,946,068
METHOD OF TREATING POLYHALITE
Filed Sept. 11, 1931
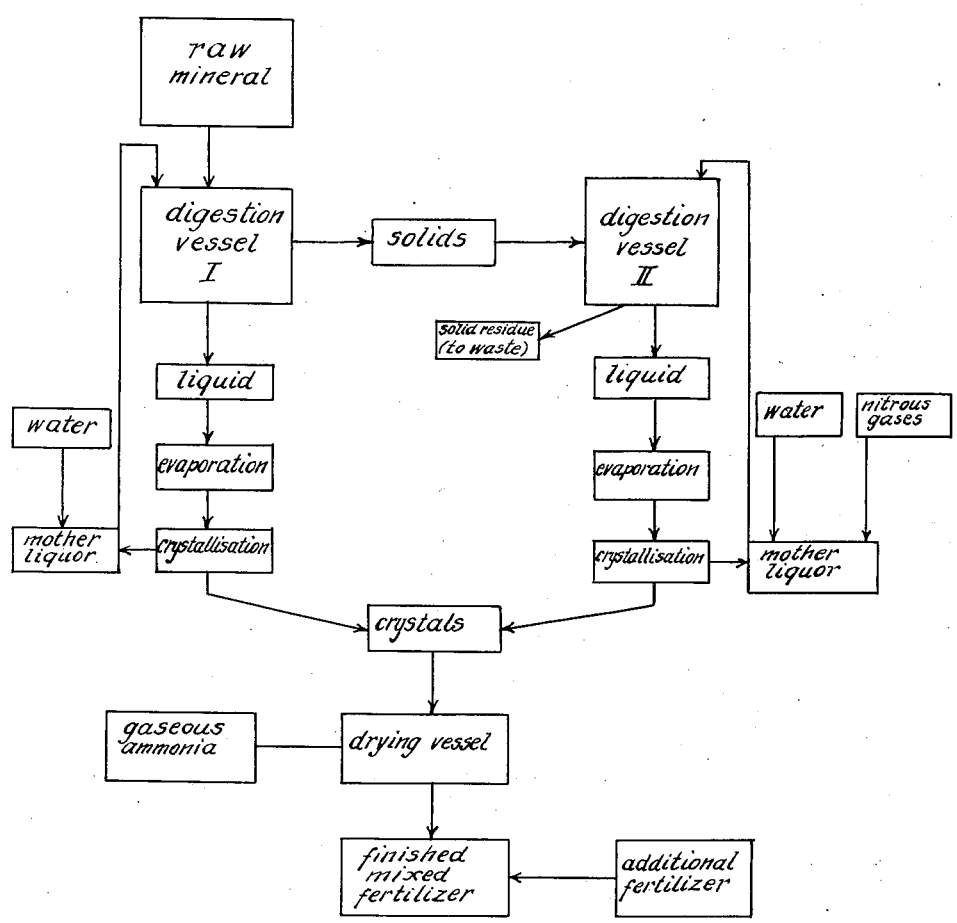
Inventor:
Hans Friedrich
by Karlmichaun,
Atty.

Patented Feb. 6, 1934

1,946,068

UNITED STATES PATENT OFFICE 1,946,068

METHOD OF TREATING POLYHALITE

Hans Friedrich, Berlin, Germany

Application September 11, 1931, Serial No. 562,409, and in Germany August 1, 1930

4 Claims. (Cl. 71—9)

My invention relates to methods of treating minerals containing fertilizer salts and more particularly to the art of converting such minerals into fertilizers.

The potassium mineral polyhalite

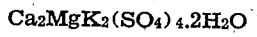

is somewhat difficult to dissolve because of the low solubility in water of the potassium sulfate contained therein, thus necessitating comparatively large volumes of water or mother liquors for dissolution. Another drawback results from the low dissolving velocity of the salt, comparatively concentrated solutions, being obtained only by prolonged heating. Moreover the mineral which also contains calcium sulfate tends to form the double salt syngenite

thus imparting to the insoluble residue a comparatively high content of potassium. As the original salt ores usually consist of a mixture of the various salt minerals and of anhydrite (i. e. anhydrous calcium sulfate), all the enumerated difficulties are usually encountered simultaneously.

According to the present invention I avoid all these drawbacks by carrying the dissolution step through in the presence of nitric acid, preferably by adding free nitric acid or nitrous gases to the water or to the mother liquor used for dissolving the mineral. In this way the solubility as well as the dissolving velocity of the salt are considerably increased and the insoluble residue obtained in the treatment of polyhalite is substantially free of potassium.

A similar effect may be obtained by first treating polyhalite with neutral mother liquors or the like and then subjecting the insoluble residue, which still contains a considerable amount of potassium, to a supplemental digestion with a mother liquor acidulated with nitric acid.

The solutions obtained by the treatment with dilute nitric acid are then further treated to cause substantially all the dissolved salts to crystallize out, which, preferably after being dried in a current of ammonia gas, form valuable fertilizers.

In practicing my invention I may for instance proceed as follows reference being had to the flow sheet here annexed to illustrate my invention:

60.3 kgs. polyhalite $(Ca_2MgK_2(SO_4)_4)$ are heated with 300 litres water and 200 kilograms of a 65% nitric acid. After about 12 hours the solution is separated from the insoluble residue, evaporated until the precipitation of salt commences, and then cooled to about 20° C. The salt mixture resulting on crystallization is separated from the mother liquor and dried in a current of ammonia gas. There are obtained 136.7 kilograms of a mother liquor containing 7.06% $K_2O$ and 9.85% N, and 45.3 kilograms of a salt containing 14.25% $K_2O$ and 5.78% N.

The mother liquor, after the addition of the calculated amounts of nitric acid and water, is reused for dissolving fresh amounts of the mineral.

By the treatment according to my invention the chlorides contained in the original salt ores are converted into the corresponding nitrates, whereby a gas mixture containing chlorine and nitrosyl chloride is formed. As this gas mixture carries off part of the available nitrogen, the nitrosyl chloride should be further treated in a well known manner to recover the available nitrogen. The highly corrosive properties of this gas mixture also necessitate the use of an apparatus which is resistive against corrosion.

If both necessities shall be obviated, I may also first treat the raw sulfatic salt ores with cold or hot water so as to substantially remove the chlorides and more particularly the sodium chloride. This fractional dissolution may be effected without any considerable losses of valuable constituents of the ore by controlling the amount of water used, and the temperature.

Various changes may be made in the details disclosed in the foregoing specification without departing from the invention or sacrificing the advantages thereof.

I claim:—

1. The method of treating polyhalite comprising heating said mineral with water in the presence of an acid nitrogen-oxygen compound and separating the solution thus obtained from the insoluble residue.

2. The method of treating polyhalite comprising heating said mineral with water in the presence of free nitric acid and separating the solution thus obtained from the insoluble residue.

3. The method of treating polyhalite comprising heating said mineral with water acidulated with nitrous gases, and separating the solution thus obtained from the insoluble residue.

4. The method of treating polyhalite comprising heating said mineral with water in the presence of an acid nitrogen-oxygen compound, separating the solution thus obtained from the insoluble residue, recovering therefrom a salt mixture by crystallization and reusing the mother liquor from the crystallization for the dissolution of further amounts of said salt mineral.

HANS FRIEDRICH.